United States Patent [19]
Suzuki

[11] Patent Number: 5,831,948
[45] Date of Patent: Nov. 3, 1998

[54] COMPACT DISK LOADING DEVICE

[75] Inventor: Shoji Suzuki, Iwaki, Japan

[73] Assignee: Alpine Electronics, Inc., Japan

[21] Appl. No.: 714,516

[22] Filed: Sep. 16, 1996

Related U.S. Application Data

[63] Continuation of Ser. No. 482,902, Jun. 7, 1995, abandoned, which is a continuation of Ser. No. 207,442, Mar. 7, 1994, abandoned, which is a continuation-in-part of Ser. No. 111,382, Aug. 24, 1993, abandoned.

[30] Foreign Application Priority Data

Mar. 10, 1993 [JP] Japan ................................. 5-016245

[51] Int. Cl.⁶ ............................................. G11B 17/22
[52] U.S. Cl. .............................................. 369/36
[58] Field of Search ........................ 369/38, 36, 270, 369/271, 75.2, 282, 75.1, 77.1–77.2, 200–201, 191, 192, 178; 360/99.12, 99.08

[56] References Cited

U.S. PATENT DOCUMENTS

| | | | |
|---|---|---|---|
| 4,498,161 | 2/1985 | Eisemann | 369/270 |
| 4,680,748 | 7/1987 | Kobayashi | 369/271 |
| 4,949,324 | 8/1990 | Arata | 369/38 |
| 5,012,462 | 4/1991 | Tsujita | 369/36 |
| 5,058,090 | 10/1991 | Ueno et al. | 369/36 |
| 5,103,437 | 4/1992 | Kawakami . | |
| 5,191,569 | 3/1993 | Kurosawa et al. | 369/38 |
| 5,247,500 | 9/1993 | Miyoshi et al. | 369/36 |
| 5,574,705 | 11/1996 | Suzuki | 369/36 |

FOREIGN PATENT DOCUMENTS

| | | | |
|---|---|---|---|
| 0369978 | 5/1990 | European Pat. Off. | 369/270 |
| 3638914 | 5/1988 | Germany | 369/270 |
| 62-22263 | 1/1987 | Japan | 369/270 |
| 62-159372 | 7/1987 | Japan | 369/271 |
| 1151059 | 6/1989 | Japan | 369/191 |
| 1154359 | 6/1989 | Japan | 369/191 |
| 2-96966 | 4/1990 | Japan | 369/270 |
| 2185756 | 7/1990 | Japan | 369/270 |
| 2-260272 | 10/1990 | Japan | 369/270 |

*Primary Examiner*—Allen Cao
*Attorney, Agent, or Firm*—Brinks Hofer Gilson & Lione

[57] ABSTRACT

A disk loading mechanism for e.g. a CD player is arranged such that a disk damper is lifted to a first position before a disk tray is drawn out from a magazine, and when the tray is moved into the space between a disk clamper chassis and a driving unit chassis, the disk clamper is lowered to a second position and confronts a disk on the tray at a close interval. Thereby the disk is prevented from dislocating from the accommodating recessed portion of the tray while it is being moved. When the tray has been moved into position, the disk clamper is further lowered so that the disk is held between the turntable and the disk clamper. As a result, the disk is prevented from dislocating from the tray while the tray is being moved to the disk driving unit.

14 Claims, 11 Drawing Sheets

COMPACT DISK LOADING DEVICE

CROSS-REFERENCE TO RELATED APPLICATION

This application is a continuation of application Ser. No 08/482,902, filed Jun. 7, 1995 now abandoned, which a continuation of application Ser. No. 08/207,442. filed Mar. 7, 1994, now abandoned, which is a continuation-in-part of U.S. Pat. application Ser. No. 08/111,382 filed Aug. 24, 1993, now abandoned.

BACKGROUND OF THE INVENTION

1. Field of the Invention

The present invention relates to a disk device (such as for a compact disk player) including a disk tray to be moved to a disk driving unit by being, for example, drawn out from a disk magazine, and more specifically, to a disk device by which dislocation of a disk from the disk tray is prevented.

2. Description of the Related Art

A tray on which a disk is placed is conventionally moved into the space between the turntable of a disk driving unit and a clamper to feed the disk, such as a compact disk or the like, into the disk driving unit.

FIG. 17 shows a disk changer as an example of a disk device using the tray. This disk changer includes a spindle motor 2 mounted on the chassis 1 of a disk driving unit and a turntable 3 driven in rotation by the motor 2. Further, a clamp chassis 4 is disposed above the chassis 1 and a clamper 5 is mounted on the clamp chassis 4. A plurality of trays T are accommodated in a magazine M and a disk D is placed on the upper surface of the accommodating recessed portion T1 of each of the trays T.

When any one of the trays T is selected and drawn out in the right direction shown in FIG. 17 and moved into the space between the turntable 3 and the clamper 5, the chassis 1 is lifted and thus the disk D is held between the turntable 3 and the clamper 5 and driven in rotation so that it is slightly lifted from the accommodating recessed portion T1 and played by a (not shown) optical pick up.

In the disk device using this kind of set of trays T, a problem arises when one of the trays T is moved into the space between the turntable 3 and the clamper 5 and when it is midway to returning into the magazine M, the disk D may be dislocated from the accommodating recessed portion T1 of the tray T and ride up on the upper surface T2 of the tray T. Further, a problem also arises when the disk D clamped between the turntable 3, and the clamper 5 is released and returned to the accommodating recessed portion T1 of the tray T. Then the disk D staggers and is liable to be lowered to a position dislocated from the accommodating recessed portion T1.

In particular, a disk changer mounted on a car is subject to vibration from the car body, and thus the disk D is liable to be dislocated from the accommodating recessed tray portion T1. Then the tray T cannot be moved or returned into the magazine M, which causes the disk device to fail.

To cope with this problem, conventionally a small roller 7 supported by a leaf spring 6 is disposed on the lower surface of the clamp chassis 4 to depress the disk D in the accommodating recessed portion by the small roller when the tray is moving, as shown in FIG. 17.

In this case, however, when the tray T has moved to the disk driving unit and the disk D is held between the turntable 3 and the clamper 5, the small roller must be forced to escape upward in FIG. 17 so that it does not prevent the rotation of the disk D. The mechanism for causing the roller 7 to escape upward renders the structure of the disk device very complex.

Further, when the tray T moves, the small roller 7 rolls on the surface of the disk D, and thus there is a drawback in that the surface of the disk D is liable to be scratched by the small roller 7. Therefore, the small roller 7 must be composed of a very soft material and its surface must be polished flat; and thus a very expensive part must be used.

An object of the present invention for solving the problems of prior art is to provide a disk device by which dislocation of a disk on a tray is prevented, without the provision of the small roller as described above.

SUMMARY OF THE INVENTION

According to the present invention, a first disk device includes a disk driving unit having a turntable and a clamper confronting the turntable and a tray which is moved into the space between the turntable and the clamper and on which a disk is placed, the disk device comprising a clamper moving mechanism for moving the clamp from the position furthest from the turntable to a position approaching the disk on the tray when the tray is being moved to the disk driving unit, and further moving the clamper to a position where the disk can be held between the clamper and the turntable when the tray is inserted into the disk driving unit.

Second, a disk device includes a chassis having a turntable, a clamp chassis having a clamper and a tray to be moved into the space between the turntable and the clamper and having a disk placed thereon, the disk device comprising an arm member stretched between the chassis and the clamp chassis, wherein when the tray is being moved to a disk driving unit and the chassis is spaced apart from the clamp chassis, the arm member is located at a position approaching the disk on the tray, and when a distance between the chassis and the clamp chassis is shortened and the disk is held between the turntable and the clamper, the arm member is moved to a position spaced apart from the disk.

Third, a disk device includes a disk driving unit having a turntable and a clamper confronting the turntable and a tray which is moved into the space between the turntable and the damper and on which a disk is placed, the disk device comprising a disk regulation member which is located on a side of the disk placing unit of the tray when the disk is held between the turntable and the damper and moved in the direction of the disk placing unit after the disk held between the turntable and the damper is released.

The above first structure prevents the disk from separating from the turntable, by making use of the movement of the damper towards the turntable. More specifically, when the turntable is being moved, the damper is moved to the position approaching the disk on the turntable, and the disk located on the turntable is regulated by the damper to prevent the disk from floating up on the tray. Further, when the tray has been completely moved to the disk driving unit, the damper is further moved to hold the disk between the turntable and the clamper.

The above second structure regulates the disk on the tray by the relative movement between the chassis and clamp chassis by providing the arm member such as, for example, a wire or the like extending between the chassis and the clamp chassis. More specifically, when the tray is being moved, the chassis is separated from the clamp chassis and when the distance through which the chassis confronts the clamp chassis is increased, the arm member stretched therebetween approaches the disk on the tray, and thus the release of the disk is prevented. Further, when the disk is clamped, since the chassis approaches the clamp chassis, the arm member stretched therebetween is spaced apart from the disk.

The above third structure provides the disk regulation member confronting the side of the disk placing unit of the tray. The disk regulating member forms a wall surface by which the lateral dislocation of the disk is prevented in the space above the tray. Further, when the clamp of the disk is released, the disk regulation member is positively moved toward the disk placing unit, whereby the disk liable to stagger is securely returned to the disk placing unit of the tray after the clamp of the disk is released.

DETAILED DESCRIPTION OF THE INVENTION

An embodiment of the present invention is described with reference to the drawings.

Figure 1:
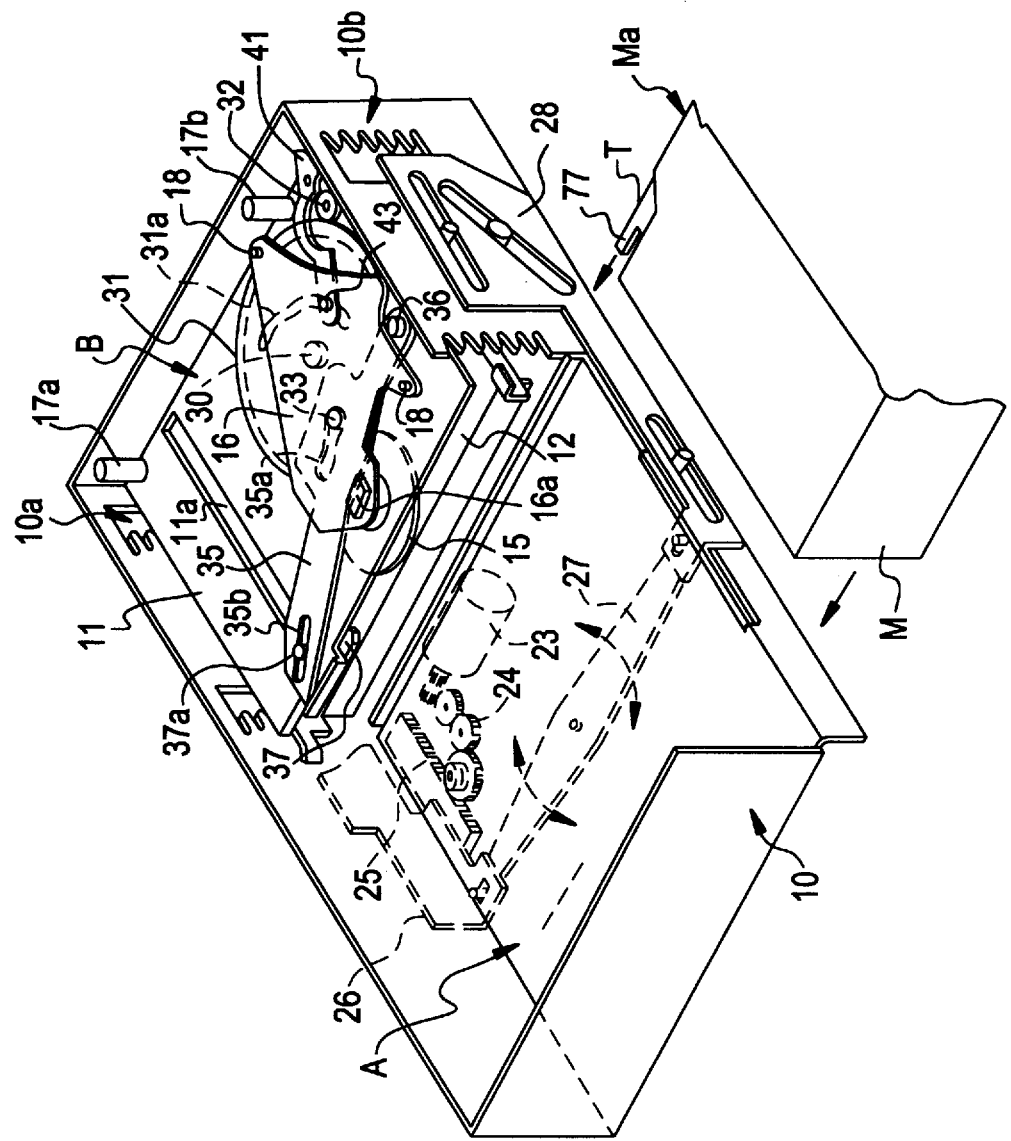
FIG. 1 is a perspective view showing a mechanical unit of a disk changer for a disk device according to the present invention.

In FIG. 1, a box shaped cabinet 10 includes a disk placing unit A and a disk selection/driving unit B. A magazine M is loaded into the disk placing unit A from the direction of the arrow in FIG. 1. As described later with reference to FIGS. 14 and 15, the magazine M is of a tray type and the oblique upper side of the magazine M in FIG. 1 is a disk taking-out port Ma.

Figure 16:
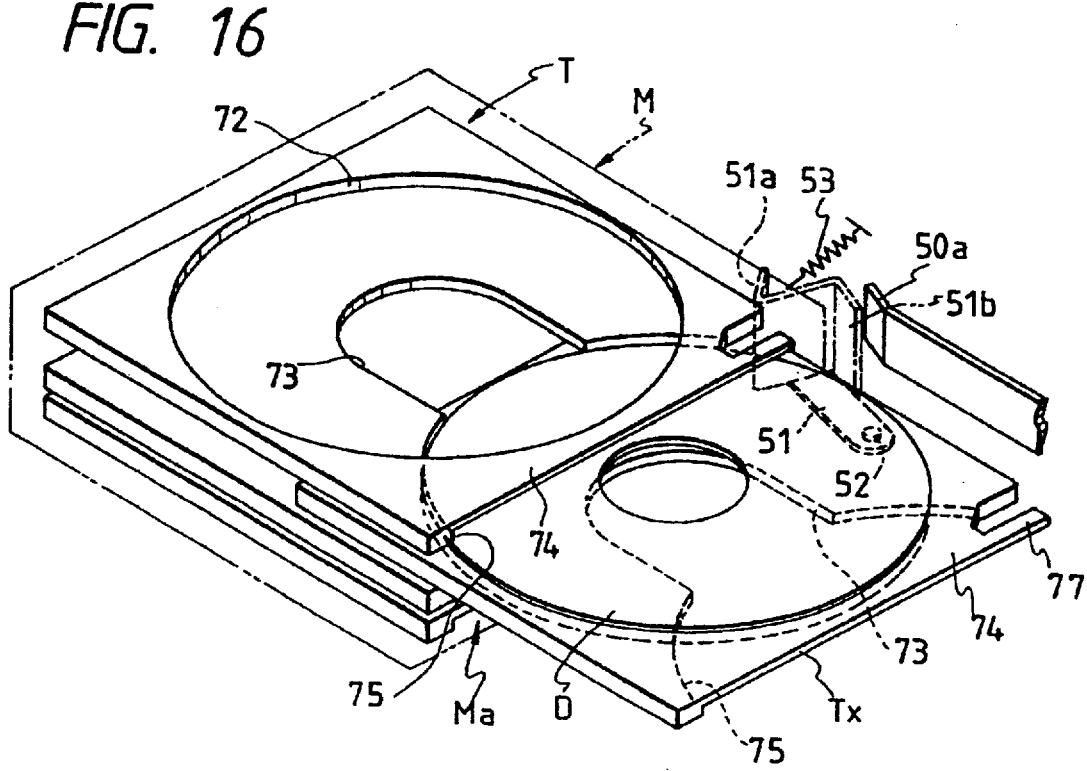
FIG. 16 is a perspective view showing the inside structure of the magazine.
Figure 17:
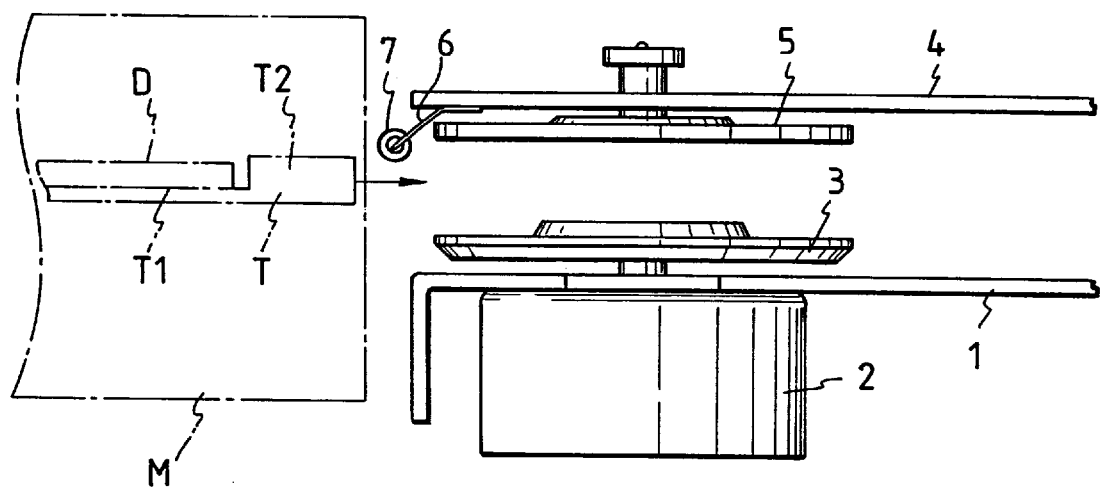
FIG. 17 is a diagram of the structure of a conventional disk changer.

Further, as shown in FIG. 16, this disk changer is arranged such that a tray Tx selected from a plurality of trays T in the magazine M loaded into the disk placing unit A is drawn midway out of the magazine M, and a disk D clamped at the disk selection/driving unit B is driven in rotation, with a portion thereof remaining in the magazine M.

The disk selection/driving unit B includes a clamp chassis 11 and a driving unit chassis 12 located below the clamp chassis 11 and in parallel therewith. Two guide shafts 17a, 17b standing on the bottom of the cabinet 10 are fixed to the bottom at the right end of the disk selection/driving unit in FIG. 1, and the clamp chassis 11 and driving unit chassis 12 are guided by the guide shafts 17a, 17b so that they can be lifted and lowered, respectively.

Figure 6:
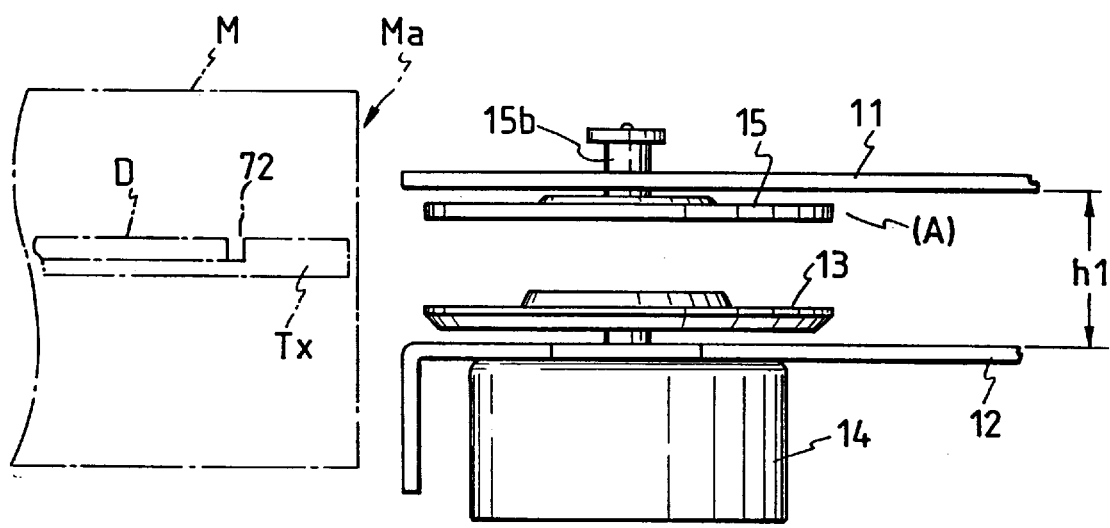
FIG. 6 is a side cross-sectional view of the disk selection/driving unit before a disk is selected.
Figure 7:
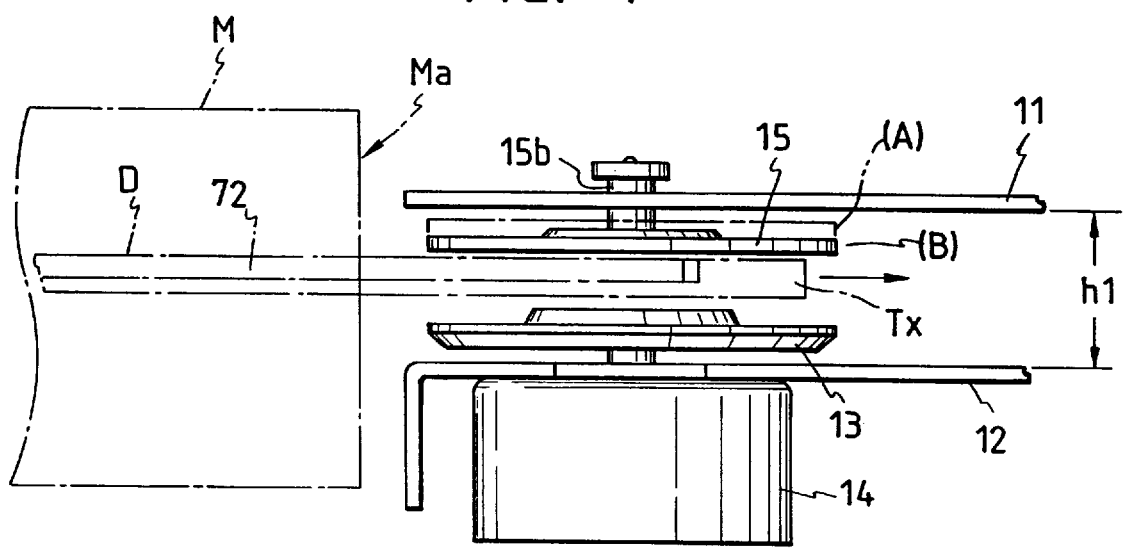
FIG. 7 is a side cross-sectional view showing the disk selection/driving unit while the tray is being moved.
Figure 8:
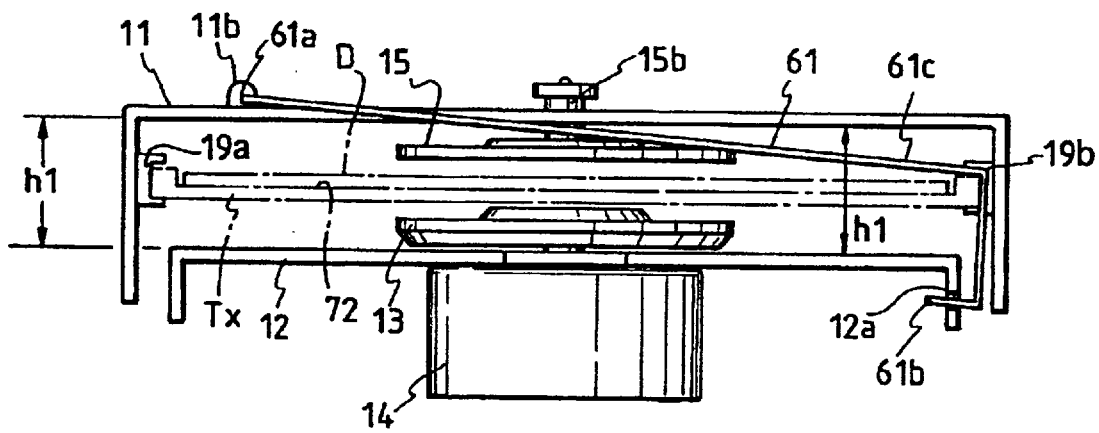
FIG. 8 is a diagram showing an arm member taken in the direction of the arrow Z of FIGS. 4 and 10.

The clamp chassis 11 and driving unit chassis 12 are locked together by a lock mechanism (not shown) at a predetermined interval defined therebetween. When both chassis 11, 12 are locked together, a wide interval h1 is maintained therebetween, as shown in FIGS. 6, 7 and 8.

Figure 5:
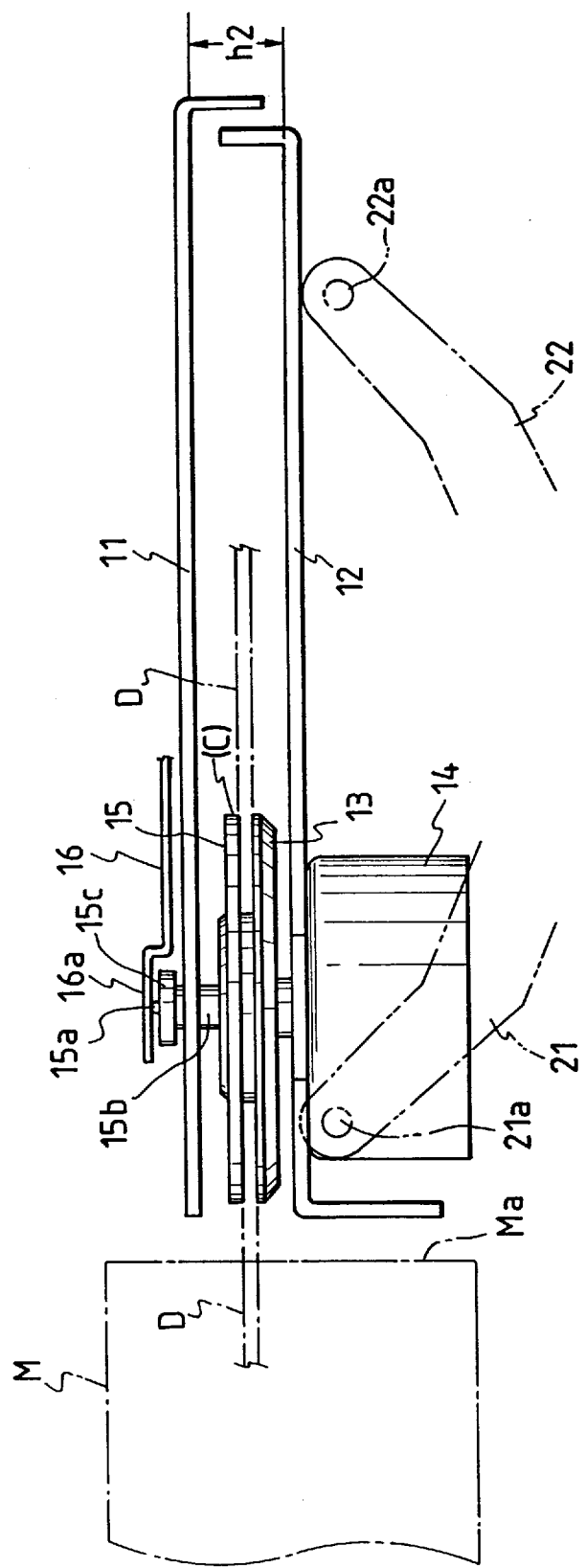
FIG. 5 is a side cross-sectional view of the disk selection driving unit in the state that a disk is clamped.

Drive links 21, 22 crossing to form an X-shape as shown in FIG. 5 are disposed on the inside of each of the opposite side plates of the cabinet 10. The upper ends of the respective drive links 21, 22 are pivotally connected to the side of the driving unit chassis 12 by connection pins 21a and 22a. As shown in FIG. 1, when the driving force of a motor 23 disposed on the lower surface of the bottom of the cabinet 10 is transmitted to a rack 25 through speed reduction gears 24, a driving plate 26 disposed on a side of the cabinet 10 is moved reciprocatingly. Further, the driving force of the driving plate 26 is transmitted to a driving plate 28 disposed on the other side of the cabinet 10 through a coupling link plate 27. With the reciprocating operation of both driving plates 26, 28, an opening angle of the X-shape formed by the driving links 21 and 22 is changed, so that the driving unit chassis 12 and the clamp chassis 11 locked to each other at interval h1 are moved upward and downward together. Thus both chassis 11 and 12 are caused to confront the tray to be selected from a plurality of the trays T in the magazine M.

Figure 9:
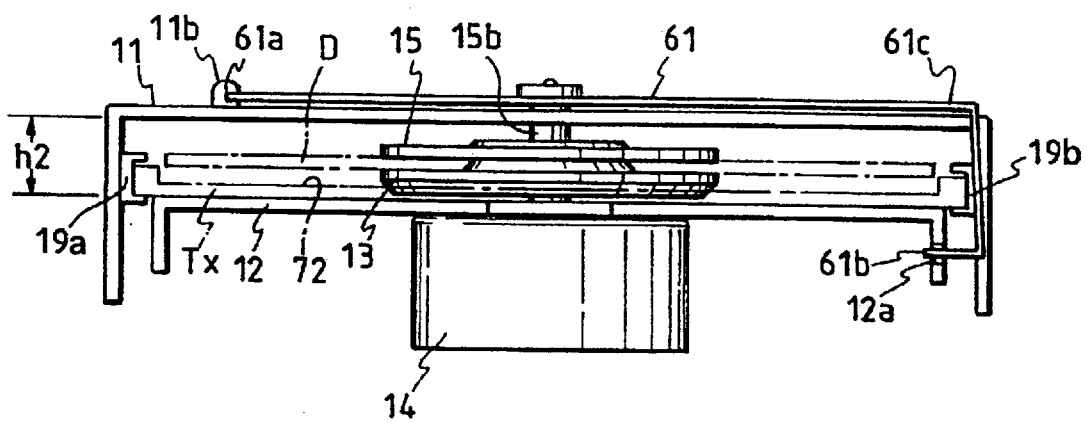
FIG. 9 is a diagram showing the arm member taken in the direction of the arrow Z of FIGS. 4 and 10 to indicate the state that the arm member is lifted.

A plurality of positioning grooves 10a, 10b are formed on the opposite sides of the cabinet 10, and when the selecting operation has been completed, only the clamp chassis 11 is positioned at and locked to any of the positioning grooves 10a, 10b. As shown in FIGS. 8 and 9, a C-shaped tray guide 19 is disposed on the inside of each of the opposite side plates of the clamp chassis 11. When the clamp chassis 11 and driving unit chassis 12 are maintained at the above interval h1, the tray Tx selected from the magazine M is drawn out by a mechanism described below and the opposite edges of the tray Tx are moved into the space between both chassis 11 and 12, being guided by the tray guides 19a, 19b.

When the selected tray Tx has been moved into the space between both chassis 11 and 12, the lock between the clamp chassis 11 and the driving unit chassis 12 is released and the driving unit chassis 12 located on the lower side is further lifted by the driving links 21, 22 and confronts the clamp chassis 11 at the narrow interval h2 as shown in FIGS. 5 and 9. When positioned at this interval, the disk can be clamped between the chassis 11 and 12.

As shown in FIGS. 1 and 5 the driving unit chassis 12 includes a turntable 13, a spindle motor 14 for driving the turntable 13 in rotation and further an optical pick up (not shown) for playing the information recorded on the disk D to be driven by the turntable 13.

Figure 2:
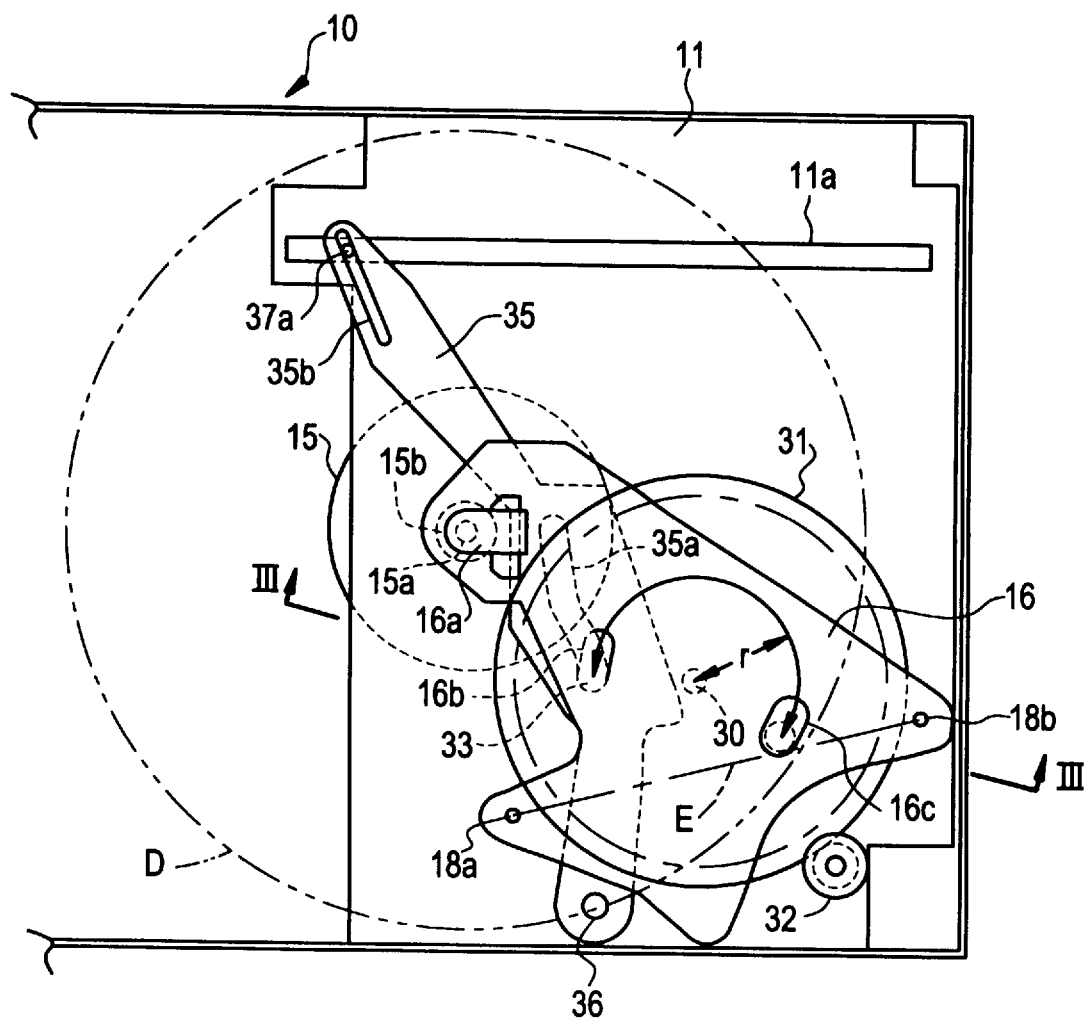
FIG. 2 is a plan view showing a disk selection driving unit of the disk changer.

A clamper 15 is mounted on the clamp chassis 11. As shown in FIG. 5, the clamper 15 has a shaft 15b which passes through the clamp chassis 11 and extends upwardly, and a pivot 15b is formed on the upper surface of the flange 15c at the upper end of the shaft 15b. A leaf spring 16 is disposed on the upper surface of the clamp chassis 11. As shown in FIGS. 1 and 2, the leaf spring 16 is fixed to the clamp chassis 11 by support pins 18a, 18b. The flange 15c of the clamper 15 is held while the removal thereof is prevented at the extreme portion of the leaf spring 16. Further, a support piece 16a, which is bent upwardly and L-shaped, is provided at the extreme end of the leaf spring 16. The pivot 15a abuts against the lower surface of the support piece 16a so that the damper 15 is pivotally supported.

The leaf spring 16 is bent and deformed about a virtual support line E extending between the support pins 18a, 18b shown in FIG. 2 and serving as a fulcrum, and the damper 15 is urged in the direction of the turntable 13 by the bending elastic force of the leaf spring 16.

Figure 3:
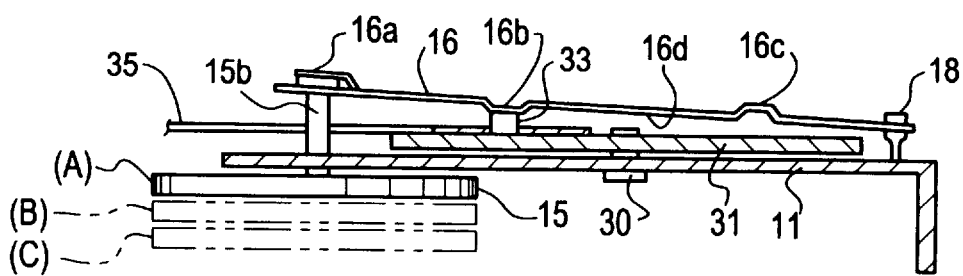
FIG. 3 is a cross sectional view taken along line III—III of FIG. 2.

As shown in FIGS. 2 and 3, a projection 16b projects in the direction of the clamp chassis 11 and is formed in the leaf spring 16. A recess 16c, which is depressed when viewed from the clamp chassis 11 side, is formed in another portion of the leaf spring 16.

Figure 4:
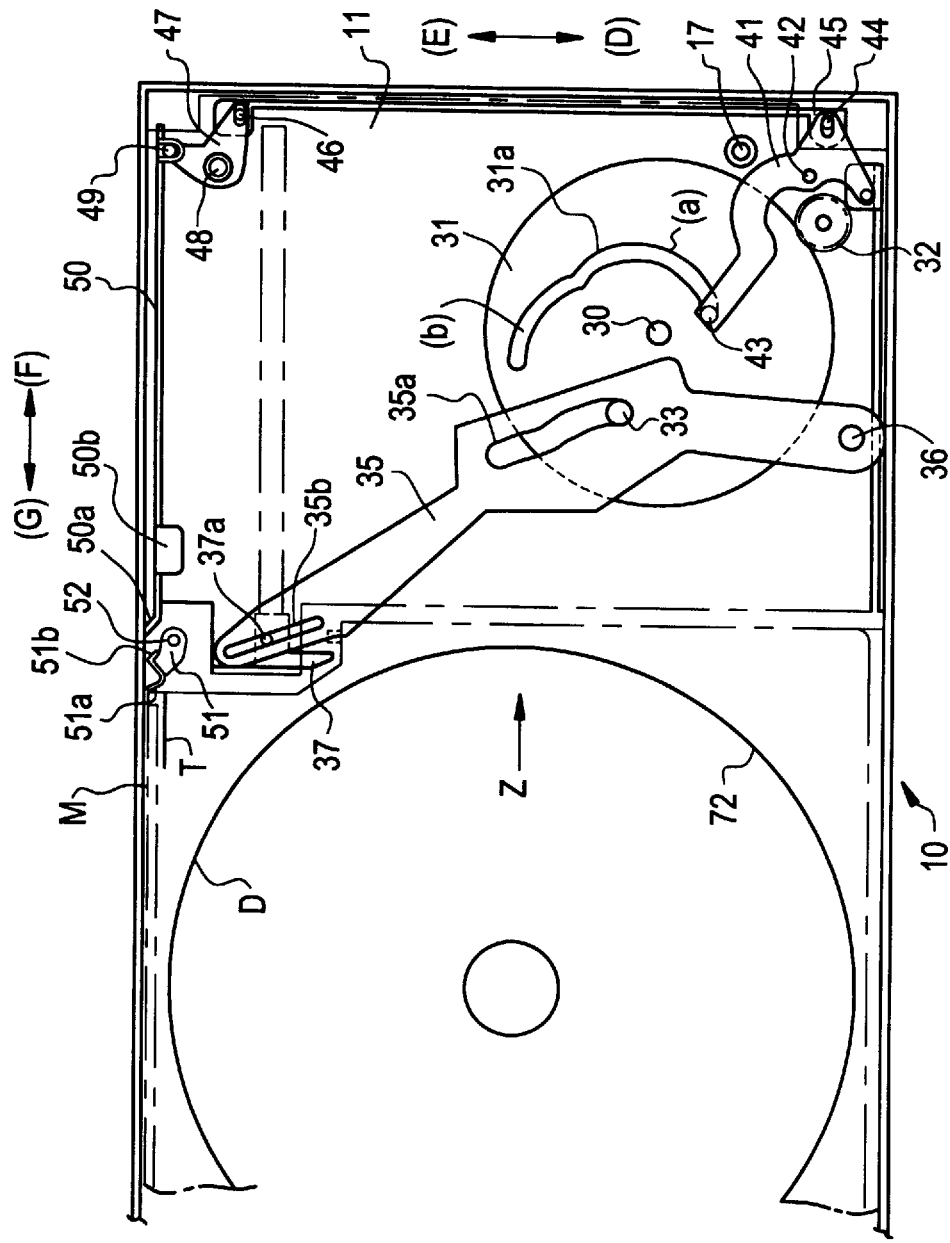
FIG. 4 is a plan view of the disk changer.

As shown in FIGS. 1, 2, and 4, a large diameter gear 31 is pivotally supported above the upper surface of the clamp chassis 11 by a shaft 30. A pinion gear 32 is disposed above the upper surface of the clamp chassis 11 and meshes with the large diameter gear 31 at all times. A motor (not shown) is mounted on the lower surface of the driving unit chassis 12. The driving force of the motor is transmitted to the pinion gear 32 through a driving force transmission shaft which has a variable length capable of following the change of the interval (h1 and h2) between the clamp chassis 11 and the driving unit chassis 12. The large diameter gear 31 is driven by the pinion gear 32.

The large diameter gear 31 performs three control functions. The first control function is to control the height of the clamper 15.

As shown in FIG. 2, the projection 16b and recess 16c of the leaf spring 16 are located on the locus of an arc having a radius r from the center of the shaft 30 of the large diameter gear 31. When the tray T is not drawn out from the magazine M, the large diameter gear 31 has a turning phase as shown in FIGS. 1 and 2, and at this time a control pin 33 fixed to the upper surface of the large diameter gear 31 abuts against the projection 16b of the leaf spring 16 so that the leaf spring 16 is lifted. At this time, the clamper 15 has a height shown by (A); refer to FIGS. 3 and 6.

When the large diameter gear 31 is driven clockwise from the phase shown in FIGS. 1 and 2, the control pin 33 is released from the projection 16b of the leaf spring 16 and slides while abutted against the lower surface 16d of the leaf spring 16. At this time, the leaf spring 16 approaches the clamp chassis 11 by its elastic force and the clamper 15 is slightly lowered as shown by (B); refer to FIGS. 3 and 7. At this time, the clamper 15 approaches the tray T at midway of its movement and confronts the upper surface of the disk D at a close interval, as shown in FIG. 7. When the clamper 15 confronts the disk D at the close interval, the disk D is prevented from moving upwardly from the accommodating recessed portion 72 of the tray T being moved.

When the large diameter gear 31 is further turned clockwise and the control pin 33 enters the recess 16c of the leaf spring 16, the leaf spring 16 further approaches the clamp chassis 11 by its elastic force. At this time, the clamper 15 is further lowered and located at the height shown by (C) in FIG. 3. At this time, the driving unit chassis 12 is lifted and the interval h2 is established between both chassis 11 and 12 as shown in FIG. 5, and at this time the disk D is held between the clamper 15 and the turntable 13.

A second control function of the large diameter gear 31 is to remove the tray T from and to put the tray T into the magazine M.

As shown in FIGS. 2 and 4, a taking-out arm 35 is disposed on the upper surface of the clamp chassis 11 and pivotally supported thereon by a shaft 36. A cam groove 31a is formed at the intermediate portion of the taking-out arm 35 and the control pin 33 disposed on the upper surface of the large diameter gear 31 is slidably inserted into the cam groove 35a. A linear sliding groove 11a is formed to the clamp chassis 11 and a taking-out hook 37 is slidably supported in the sliding groove 11a (shown only in FIG. 4). A pin 37a is formed on the upper surface of the taking-out hook 37 integrally therewith. A slot 35b is formed at the extreme end of the taking-out arm 35 and the pin 37a is inserted into the slot 35b. When the large diameter gear 31 is driven clockwise, the taking-out arm 35 is turned clockwise in accordance with the turning locus of the control pin 33, and thus the taking-out hook 37 moves linearly along the sliding groove 11a.

While the taking-out hook 37 moves from the position shown in FIG. 4 (in the right direction in the figure) as the large diameter gear 31 is turned, the tray Tx selected in the magazine M is fed to the disk clamp position in the disk selection/driving unit B.

A third control function of the large diameter gear 31 is to control the drive of the stopper 51 for the tray and a disk regulation member 55.

As shown in FIG. 4, a cam groove 31a is formed on the large diameter gear 31. A drive link 41, which turns about a shaft 42, is provided with the clamp chassis 11 and a slide pin 43 disposed at the extreme end of the drive link 41 is inserted into the cam groove 3a coupling plate 45 is coupled with the drive link 41 through a pin 44. The coupling plate 45 is supported at the right end surface shown in the figure so that it can be moved in a (D)-(E) direction shown in FIG. 4. The upper end of the coupling plate 45 as shown in the figure is coupled with a coupling link 47 by a pin 46. The coupling link 47 is pivotally supported on the clamp chassis 11 by a pin 48. Then, the coupling link 47 is coupled with a control plate 50 by a pin 49. The control plate 50 is supported on the upper side of the clamp chassis 11 shown in FIG. 4 so that it can be moved in an (F)-(G) direction.

Figure 10:
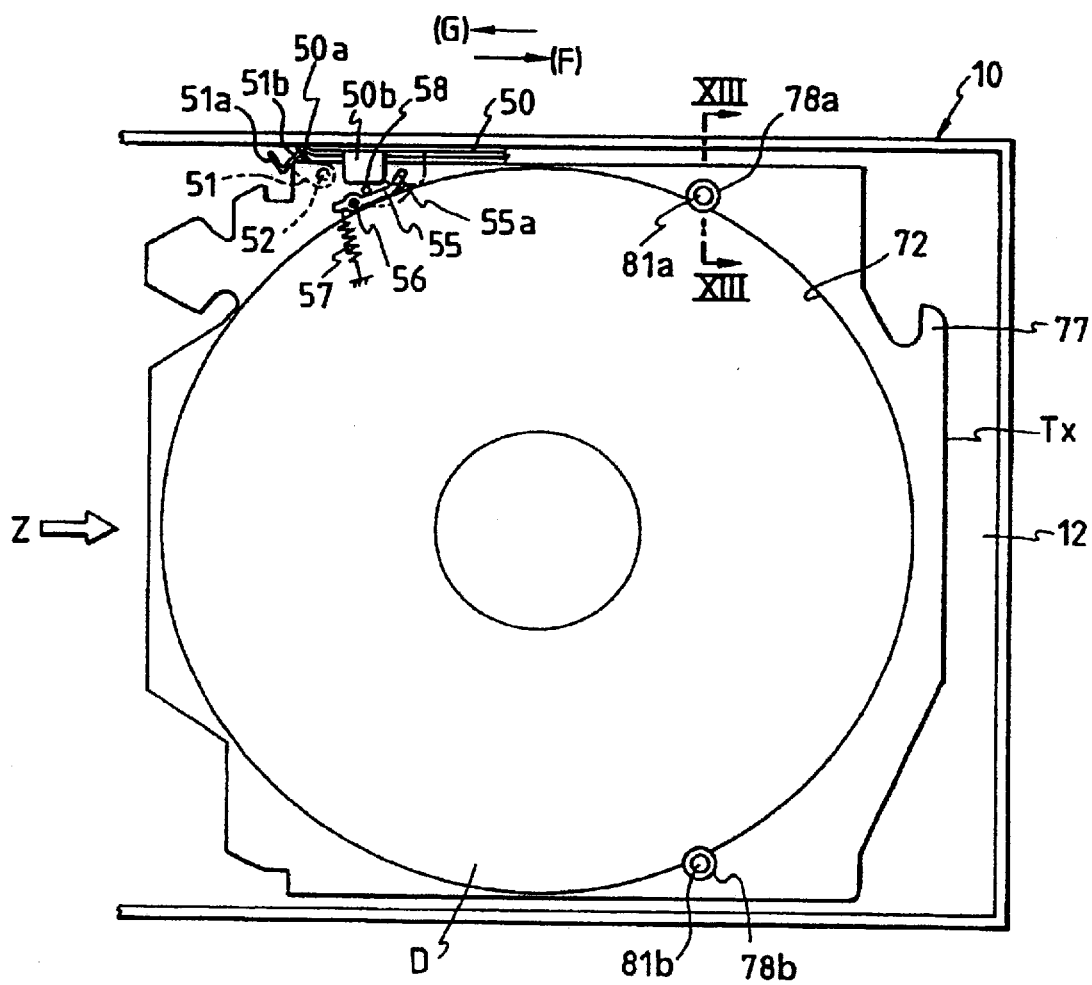
FIG. 10 is a plan view of the disk selection/ driving unit showing a stopper for a tray and a disk regulating member.

As shown in FIGS. 4 and 10, the stopper 51 is supported on the lower surface of the clamp chassis 11 so that it can be turned about a pin 52. As exaggeratedly shown in FIG. 16, the stopper 51 is urged clockwise by a spring 53. Further, the stopper 51 has a regulating surface 51a and a surface to be depressed 51b each formed thereto. As shown in FIG. 4, before the tray T is taken out, the stopper 51 is turned clockwise by the urging force of the spring 53 and the regulating surface 51a is out of the passing-through region of the tray T.

When the large diameter gear 31 is driven clockwise from the state shown in FIG. 4, the tray Tx selected from the magazine M is drawn out by the taking-out hook 37. When the large diameter gear 31 is turned, the slide pin 43 first slides along the same radius portion (a) of the cam groove 3a, and thus the driving link 41 is not driven. When the large diameter gear 31 is about to finish its clockwise turning operation and the tray Tx has been moved into the space between the chassis 11 and 12, the slide pin 43 reaches the driving portion (b) of the cam groove 31a where the radius thereof is abruptly changed and the drive link 41 is abruptly driven counterclockwise.

With this arrangement, the coupling plate 45 is driven in the (E) direction and the control plate 50 is driven in the (G) direction. Then, the surface to be depressed 51b of the stopper 51 is depressed by the depressing portion 50a provided at the extreme end of the control plate 50, so that the stopper 51 is driven counterclockwise. As a result, as shown in FIGS. 10 and 16, the regulating surface 51a of the stopper 51 is hooked to the rear end of the tray Tx which has been drawn out, and thus the tray Tx is prevented from returning into the magazine M. Further, the regulating surface 51a blocks the front side of the trays T remaining in the magazine, to prevent another tray T from flying out.

Figure 11:
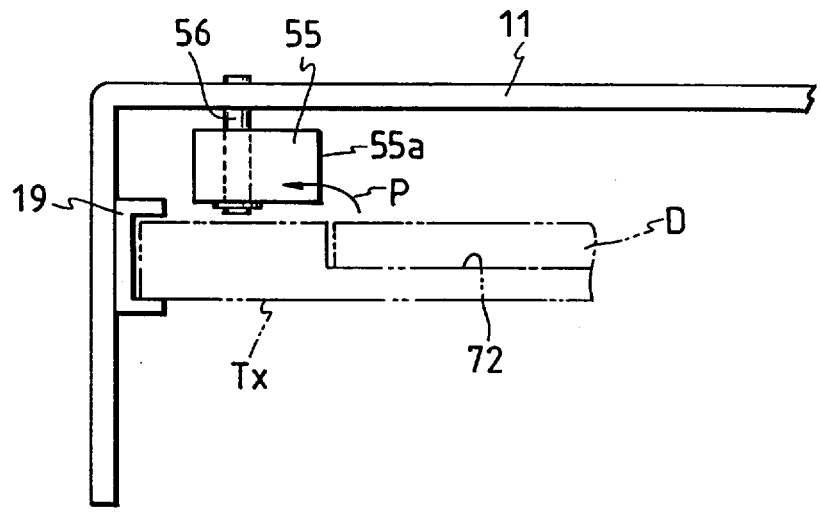
FIG. 11 is a fragmentary view showing the disk regulating member taken in the direction of the arrow Z of FIGS. 4 and 10.
Figure 12:
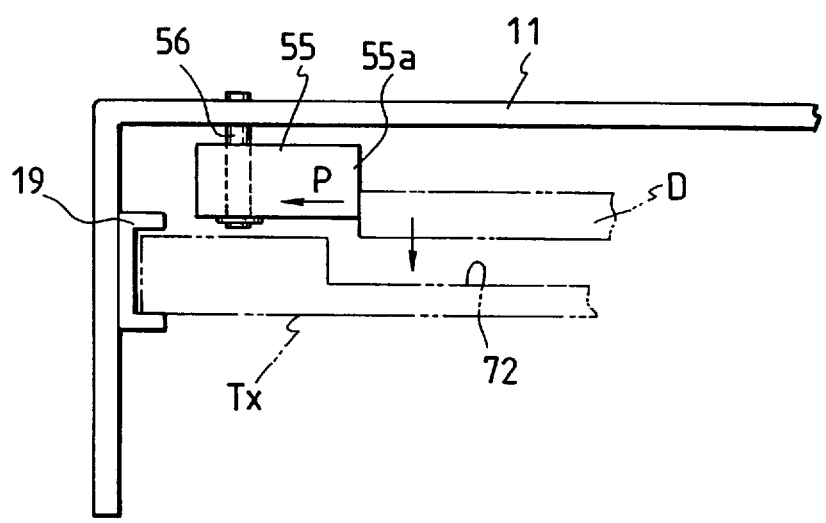
FIG. 12 is a fragmentary view showing the operation of the disk regulating member taken in the direction of the arrow Z of FIGS. 4 and 10.

Further, as shown in FIGS. 10 to 12, the disk regulation member 55 is disposed on the lower surface of the clamp chassis 11. This disk regulation member 55 is pivotally supported by a pin 56 fixed to the lower surface of the clamp chassis 11 and urged counterclockwise in FIG. 10 by a spring 57 stretched between the disk regulation member 55 and the clamp chassis 11. Further, a stopper pin 58 is disposed on the lower surface of the clamp chassis 11 and the disk regulation member 55 is regulated to turn counterclockwise by the stopper pin 58.

As shown in FIG. 11, the disk regulation member 55 is disposed at the position where it fills the gap between the tray Tx which has been drawn out and the lower surface of the clamp chassis 11. As shown in FIG. 10, the disk regulation member 55 is disposed on the left side of the clamp chassis 11. When the tray Tx is drawn out and being moved into the space between the chassis 11, 12, the disk D on the tray Tx passes through the lower side of the disk regulation member 55 so that the disk D is prevented from floating from the accommodating recessed portion 72 of the tray Tx.

Further, when the tray Tx has been completely moved into the space between the chassis 11 and the chassis 12 as shown in FIG. 10, the side surface 55a of the disk regulation member 55 forms a wall on the upper side portion of the accommodating recessed portion 72 of the tray Tx as shown in FIG. 11. Thus the disk D when positioned in the accommodating recessed portion 72, or in its midway position of being lifted from the accommodating recessed portion 72 for clamping, is prevented from being dislocated along the line shown by the arrow P of FIG. 11.

Further, a driving piece 50b is formed by bending the control plate 50. When the control plate 50 is driven in the (F)-(G) direction by the driving force of the large diameter gear 31, the driving piece 50b abuts against the extreme end of the disk regulation member 55, and thus the disk regulation member 55 is driven clockwise as shown by the dot-dash-line of FIG. 10. In particular, since the side surface 55a of the disk regulation member 55 projects upwardly of the accommodating recessed portion 72 of the tray Tx just after the disk D clamped between the turntable 13 and the clamper 15 is released, the disk D just released from the clamp can be securely returned into the accommodating recessed portion 72 of the tray Tx.

More specifically, when the tray Tx has been drawn out and the disk D is held between the turntable 13 and the clamper 15, the control plate 50 is moved in the (G) direction as shown in FIG. 10 and the driving piece 50b is released from the disk regulation member 55. When the disk D has been played, the large diameter gear 31 starts to be turned counterclockwise. At this time the control plate 50 starts to be driven in the (F) direction by the cam groove 31a of the large diameter gear 31. Consequently, just after the disk held between the turntable 13 and the clamper 15 is released, the driving piece 50b of the control plate 50 abuts against the disk regulation member 55 and thus the disk regulation member 55 is driven clockwise.

At this time, as shown in FIG. 12, the periphery of the disk D which has been just released from the clamp and still lifted above the tray T is forcibly pushed slightly in the right direction in FIG. 12 by the side surface 55a of the disk regulation member 55. As a result, the disk D is not only prevented from staggering in the P direction but also positively returned to the space above the accommodating recessed portion 72 of the tray Tx, so that the disk D can be securely lowered into the accommodating recessed portion 72.

FIGS. 11 and 12 show the disk selection/driving unit B viewed from the direction of the arrow Z in FIGS. 4 and 10. The disk regulation member 55 is disposed on the left side when viewed from the arrow Z, and thus the dislocation of the disk from the tray T in the left direction (P direction) of the arrow Z can be prevented. On the other hand, the disk is prevented from removing by a mechanism shown by FIGS. 8 and 9 on the right side of the arrow Z.

As shown in FIGS. 8 and 9, an L-shaped arm member 61 is stretched between the clamp chassis 11 and the driving unit chassis 12. In this embodiment the arm member 61 is made by bending and deforming a steel wire. However, the arm member 61 may be composed of a resin formed in an L-shape or may be a metal plate bent to an L-shape.

The arm member 61 has an end 61a pivotally supported by a support piece 11b formed by bending the upper surface of the clamp chassis 11, and the other extreme end 61b thereof is hooked to the support hole 12a formed to the side surface on the right side of the driving unit chassis 12 in the figure.

As shown in FIG. 8, when the tray Tx is being moved, the interval between the clamp chassis 11 and the driving unit chassis 12 is wide as shown by hi. Therefore, the arm member 61 is lowered on the right side thereof in FIG. 8 and the regulating portion 61c of the arm member 61 approaches above the tray on the right side of the Z arrow. With this arrangement, the edge of the disk D on the right side thereof in the figure is prevented from flying out of the accommodating recessed portion 72 of the tray T.

When the tray has been completely drawn into the disk selection/driving unit and clamped between the turntable 13 and the clamper 15, the clamp chassis 11 approaches the driving unit chassis 12 at the interval h2 as shown in FIG. 9. The arm member 61 is lifted upward at the right side thereof in the figure by the approach and the regulating portion 61c of the arm member 61 is separated from the disk D, and thus the rotational drive of the disk D is not interfered with.

Further, when the disk D has been driven, the interval between the clamp chassis 11 and the driving unit chassis 12 is increased just after the disk held between the turntable 13 and the clamper 15 is released, and thus the regulating portion 61c of the arm member 61 approaches the tray Tx in the state that it is inclined. At this time, the disk, just after the clamp thereof is released, is securely returned into the accommodating recessed portion 72 by being guided by the inclined regulating portion 61c. Therefore, the disk D is not released in the right direction shown in FIGS. 8 and 9.

Figure 14:
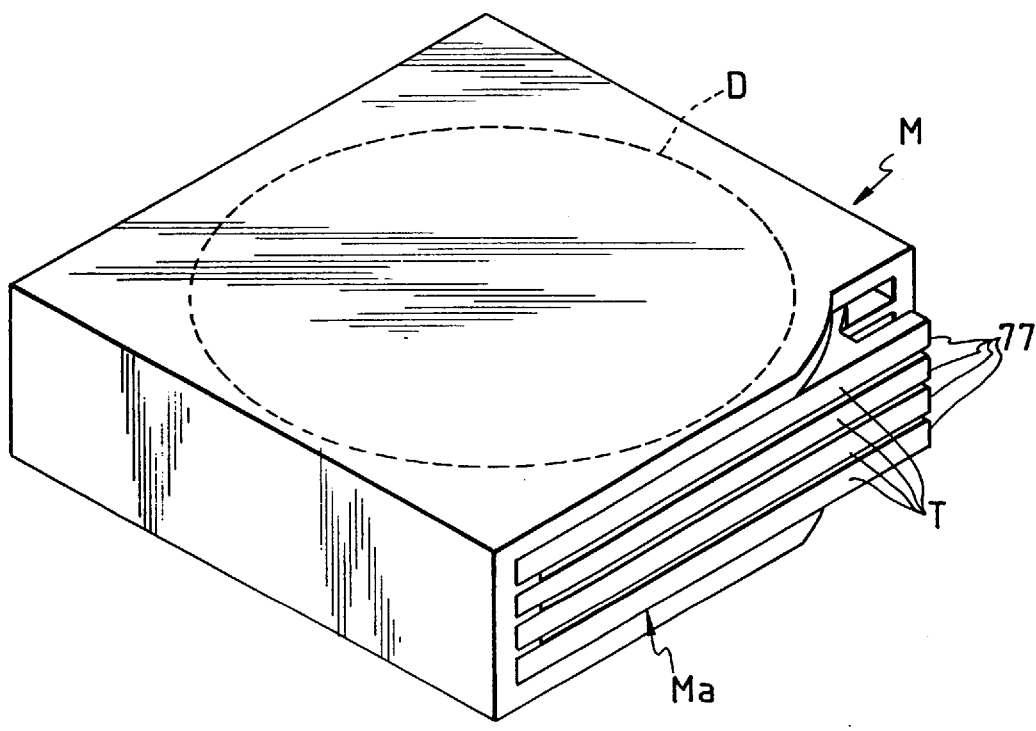
FIG. 14 is a perspective view of a disk magazine viewed obliquely downwardly.

Next, the structure of the magazine M to be loaded to the disk placing unit A shown in FIG. 1 is described. FIG. 14 is a perspective view of the magazine M viewed obliquely downwardly, FIG. 15 is a perspective view of the magazine M viewed obliquely upwardly, and FIG. 16 is a perspective view showing the inside structure of the magazine M.

A plurality of the trays T are accommodated in the magazine M and a disk D is disposed on each of the trays T. In the aforesaid disk changer, six stages of the positioning grooves 10a, 10b are vertically formed on the cabinet 10. The clamp chassis 11 and driving unit chassis 12 have six stages of vertical stopping positions. Therefore, although the six trays T in the magazine M can be selected, the magazine M illustrated in FIG. 14 and the following figures accommodates four trays T for simplicity.

Figure 15:
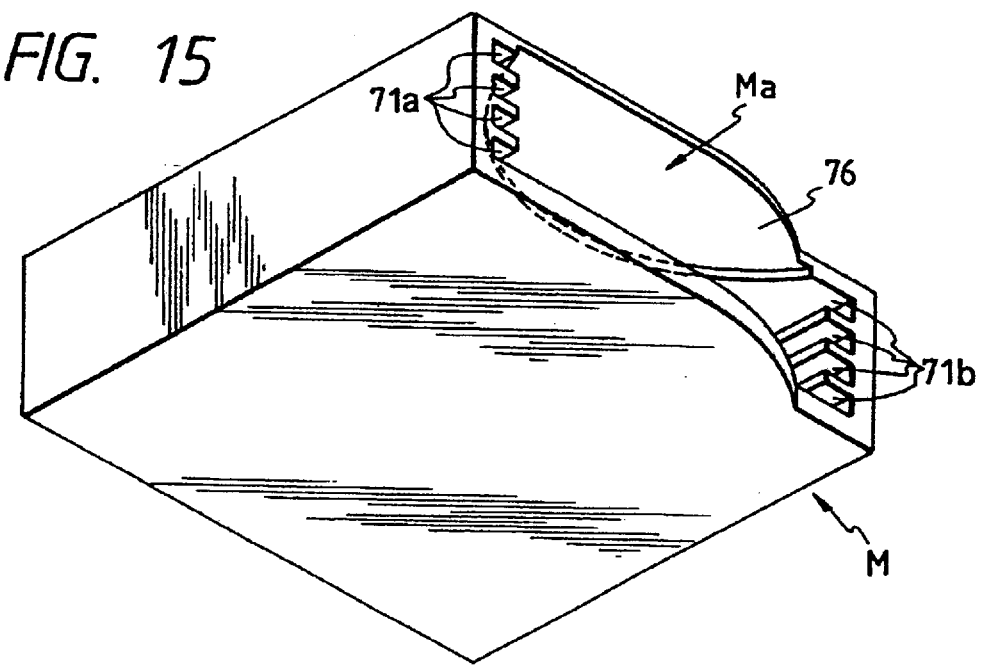
FIG. 15 is a perspective view of the magazine viewed obliquely upwardly.

As shown in FIG. 15, a plurality of stages of sliding grooves 71a, 71b are formed on the inner surface of each of the opposite side walls of the magazine M. The opposite edge portions of each tray T are slidably accommodated in the sliding grooves 71a, 71b and each tray T can be drawn out from the taking-out port Ma of the magazine.

As shown in FIG. 16, each tray T has accommodating recessed portion 72 formed to the upper surface thereof so that the disk D is placed on the portion 72, and further the bottom of the accommodating recessed portion 72 is cut out to define a U-shaped center hole 73. Further, a partially circular recess 75 is formed downwardly to the lower surface of the front plate 74 of the tray T and continued to the center hole 73. When the tray Tx is drawn out and the disk D located thereon is lifted, the disk D is separated from the accommodating recessed portion 72 of the tray Tx and positioned between the accommodating recessed portion 72 and the partially circular recess 75 on the lower surface of the tray T positioned above the accommodating recessed portion 72 and driven in rotation. Further, as shown in FIG. 15, a partially circular recess 76 is also formed on the inner surface of the ceiling plate of the magazine M, and when the uppermost tray T is drawn out, the disk D on the tray T is lifted and driven in the space between the accommodating recessed portion 72 and the recess 76.

Further, a projection 77 which the taking out hook 37 engages is formed on the front side of each tray T.

Figure 13:
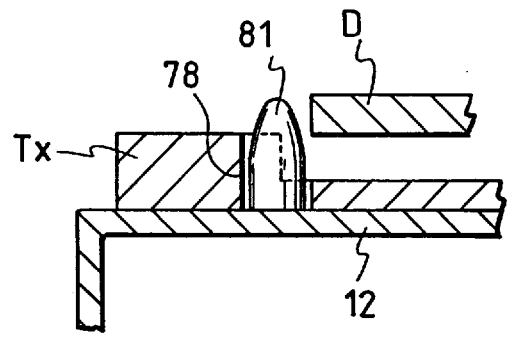
FIG. 13 is an enlarged cross-sectional view taken along line XIII—XIII of FIG. 10.

Further, as shown in FIG. 10, positioning holes 7a, 7b are at two positions (or three or more positions) on the edge of the accommodating recessed portion 72 of the tray TX. As shown in FIG. 13, when the tray Tx has been completely moved into the space between the clamp chassis 11 and the driving unit chassis 12 and the driving unit chassis 12 is lifted, the lower surface of the tray Tx is disposed on the upper surface of the driving unit chassis 12. Positioning pins 81a, 81b each having a tapered extreme end are disposed on the upper surface of the driving unit chassis 12 and engage the positioning holes 78a, 78b so that the tray Tx can be positioned.

Further, as shown in FIGS. 10 and 13, each of the positioning pins 81a, 81b confronts the periphery of the disk D at the edge of the accommodating recessed portion 72 of the tray. As a result, the periphery of the disk D is regulated by the positioning pins 81a, 81b until the disk D is lifted from the accommodating recessed portion 72 by the turntable 13 and clamped by the clamper 15, and thus the dislocation of the disk D in the right and left direction in FIG. 13 (in the vertical direction shown in FIG. 10) is prevented. Consequently, the disk D is centered so that it is securely held between the turntable 13 and the clamper 15.

Next, operation of a disk selection type player with the aforesaid arrangement is described.

1. When No Disk is Selected

When a disk D is not to be played, the large diameter gear 31 disposed on the upper surface of the clamp chassis 11 is turned counterclockwise to the phase shown in FIGS. 1, 2 and 4. At this time, the control pin 33 of the large diameter gear 31 is located at the groove start end of the cam groove 35a of the taking-out arm 35, so that the taking-out arm 35 is turned counterclockwise.

At this time, as shown in FIGS. 2 and 3, the projection 16b projecting toward the lower surface of the leaf spring 16 rides on the control pin 33 disposed on the large diameter gear 31, and thus the leaf spring 16 is located at the position furthest from the clamp chassis 11. Therefore, the clamper 15 supported at the extreme end of the leaf spring 16 is located at the position furthest from the turntable 13; refer to Figures 3 and 6.

Further, the sliding pin 43 disposed on the drive link 41 is located at the groove start end of the same radius portion (a) of the cam groove 31a of the large diameter gear 31, and the drive link 41 is turned clockwise in FIG. 4. Thus, the coupling plate 45 is moved in the (D) direction and the control plate 50 is moved in the (G) direction, and thus the depressing portion 50a at the extreme end of the control plate 50 is separated from the stopper 51 provided with the clamp chassis 11. Therefore, the stopper 51 is turned clockwise by the urging force of the spring 53 and the regulating surface 51a of the stopper 51 is out of the moving region of the tray T. Further, the driving piece 50b formed on the control plate 50 is also separated from the disk regulation member 55. As a result, the disk regulation member 55 is urged counterclockwise by the spring 57 in the same way as shown in FIG. 10 and regulated by the stopper pin 58.

Further, at this time, the clamp chassis 11 and driving unit chassis 12 are locked together at the wide interval h1, and thus the arm member 61 stretched between the clamp chassis 11 and the driving unit chassis 12 is lowered on the right side thereof when viewed from the arrow Z, as shown in FIG. 8.

2. Disk Selection/Drawing Operation

Operation of selecting the tray T on which a desired disk D is placed is carried out by driving the motor 23 shown in FIG. 1. The driving force of the motor 23 is transmitted to the rack 25 through the speed reduction gears 24, and drives the driving plate 26. This driving force is transmitted to the driving plate 28 through the coupling link plate 27 and drives both driving plates 26, 28. The driving unit chassis 12 is moved upward and downward by the driving force through the combined X-shape driving links 21 and 22, and the clamp chassis 11 locked to the driving unit chassis 12 at the interval hi is also moved upward and downward together with the driving unit chassis 12.

When the clamp chassis 11 and driving unit chassis 12 reach the position confronting the desired disk D in the magazine M, the upward/downward movement of both chassis 11 and 12 is stopped, and only the clamp chassis 11 is locked in the cabinet 10 by any of the positioning grooves 10a shown in FIG. 1. Note that the driving unit chassis 12 is not locked to the cabinet 10.

Next, the large diameter gear 31 starts to be turned clockwise by the pinion gear 32. When the large diameter gear 31 is turned clockwise, the control pin 33 first slides in the cam groove 35a of the taking-out arm 35 and the taking-out arm 35 is driven clockwise, and thus the taking-out hook 37 coupled with the extreme end of the taking-out arm 35 is moved in the right direction shown in the figure from the position shown in FIGS. 1, 2 and 4. At this time, the projection 77 of the tray Tx selected from the magazine M is drawn out in the right direction in the figure by the taking-out hook 37, and the tray Tx is drawn out to the space between the clamp chassis 11 and the driving unit chassis 12. At this time, the tray Tx is moved in the space between both chassis 11 and 12, being guided by the C-shaped tray guides 19a, 19b disposed on the inner surfaces of the opposite side plates of the clamp chassis 11.

Further, when the large diameter gear 31 starts to be turned clockwise, the control pin 33 is released from the projection 16b of the leaf spring 16 and abuts against the lower surface 16d of the leaf spring 16 (refer to FIG. 3) and slides on the lower surface 16d. As a result, the leaf spring 16 approaches the clamp chassis 11 by its elastic force, and the clamper 15 is lowered to the position (B) shown in FIGS. 3 and 7. Therefore, the clamper 15 approaches a position just above the tray Tx which is being drawn out by the taking-out arm 35 and moved and confronts the same at a close interval. Therefore the disk D in the accommodating recessed portion 72 of the tray Tx in the midway of movement is regulated by the clamper 15 located just above it and prevented from dislocating from the accommodating recessed portion 72.

Further, as shown in FIG. 11, the disk regulation member 55 is disposed on the lower surface of the clamp chassis 11 on the left side of the arrow Z shown in the figure, and positioned between the upper surface of the tray Tx and the clamp chassis 11. Consequently, the periphery of the disk D on the tray Tx passes below the lower side of the disk regulation member 55, and thus the periphery of the disk D is prevented from dislocating from the accommodating recessed portion 72 of the tray Tx. Further, when the tray Tx has been completely drawn out to the position shown in FIG. 10, the side surface 55a of the disk regulation member 55 forms a wall surface between the upper surface of the tray Tx and the lower surface of the clamp chassis 11 on a side of the accommodating recessed portion 72, as shown in FIG. 11. Therefore, even if the clamper 15 is moved upward by vibration and the disk D is lifted from the accommodating recessed portion 72, the disk D is prevented from dislocating to the side of the tray Tx along the locus P shown in FIG. 11.

On the other hand, at this time, since the interval h1 is established between the clamp chassis 11 and the driving unit chassis 12, the arm member 61 is lowered on the right side thereof on the right side of the arrow Z in the figure as shown in FIG. 8, and thus the regulating portion 61c of the arm member 61 approaches above the tray Tx on the right side in the figure. As a result, the periphery of the disk on the right side thereof shown in the figure is not removed upward from the accommodating recessed portion 72 of the tray Tx, and further is not released from the accommodating recessed portion 72 in the right direction shown in the figure.

As described above, when the tray Tx is selected and moved into the space between the clamp chassis 11 and the driving unit chassis 12, the clamper 15 downwardly confronts the disk D in the accommodating recessed portion 72 at the close interval, the disk regulation member 55 confronts the disk D on the left side of the arrow Z as shown in FIG. 11, and further the regulating portion 61c of the arm member 61 regulates the right periphery of the disk D as shown in FIG. 8. Therefore, the disk D is completely prevented from dislocating from the accommodating recessed portion 72 of the tray Tx.

3. Disk Clamp Operation

When the large diameter gear 31 is turned to the furthest clockwise position, the tray Tx is completely drawn out into the space between both chassis 11 and 12 by the taking-out arm 35. At this time, the driving unit chassis 12 is further lifted by the driving links 21, 22 and the interval between the clamp chassis 11 locked to the cabinet 10 and the driving unit chassis 12 is shortened to h2.

At this time, the lower surface of the tray Tx is disposed on the upper surface of the driving unit chassis 12 and the positioning pins 81a, 81b disposed on the upper surface of the driving unit chassis 12 are engaged with the positioning holes 78a, 78b of the tray Tx, so that the tray Tx is positioned as shown in FIG. 10.

At the same time, the turntable 13 (provided with the driving unit chassis 12 being lifted) engages the center hole of the disk D. Further, the disk D is lifted from the accommodating recessed portion 72 of the tray Tx by the turntable 13. At this time, the extreme ends of the positioning pins 81a, 81b confront the opposite sides of the periphery of the disk D, and the disk D is centered and guided so that it is not dislocated in the direction of the disk surface, as shown in FIG. 13.

Further, when the large diameter gear 31 has been completely turned clockwise, the control pin 33 provided on the large diameter gear 31 engages the recess 16c of the leaf spring 16, and thus the leaf spring 16 further approaches the clamp chassis 11 and the clamper 15 is lowered to the lowest position (C). At this time, the disk D is clamped between the turntable 13 and the clamper 15 as shown by FIG. 5.

Note, at the time when the driving unit chassis 12 is lifted and the interval between the driving unit chassis 12 and the clamp chassis 11 is shortened to h2, the arm member 61 is lifted on the right side thereof as shown in FIG. 9 and the regulating portion 61c of the arm member 61 is separated from the disk D. Therefore, the rotation of the disk D is not prevented by the arm member 61.

Further, at the time when the large diameter gear 31 is turned to the furthest clockwise position, the drive link 41 is driven counterclockwise by the driving portion (b) of the cam groove 31a of the large diameter gear 31, and thus the coupling plate 45 is moved in the (E) direction and the control plate 50 is moved in the (G) direction. Then, the depressing portion 50a at the extreme end of the control plate 50 abuts against the surface to be depressed 51b of the stopper 51. Thus the stopper 51 is turned counterclockwise and the regulating surface 51a of the stopper 51 is hooked to the rear end of the tray Tx. Thus the tray Tx is prevented from returning in the magazine M direction, as shown in FIG. 10. Further, the trays T remaining in the magazine M are prevented from flying out of the magazine M by the regulating surface 51a.

4. Clamp Release Operation

When playing of the disk has been completed, the large diameter gear 31 is turned counterclockwise and thus the control pin 33 disposed on the large diameter gear 31 is released from the recess 16 c of the leaf spring 16 and abuts against the lower surface 16d of the leaf spring 16. Thus, the leaf spring 16 is slightly lifted and the clamper is lifted to the position (B) and the disk D clamped between the turntable 11 and the clamper 15 is released.

At the same time, the driving unit chassis 12 is lowered and the disk D lifted by the turntable 13 is returned to the accommodating recessed portion 72 of the tray Tx, and the upper surface of the driving unit chassis 12 is separated from the lower surface of the tray Tx.

At this time, the drive link 41 is driven clockwise by the cam groove 31a of the large diameter gear 31, and thus the coupling plate 45 is driven in the (D) direction and further the control plate 50 is driven in the (F) direction. As a result, the driving piece 50b provided on the control plate 50 abuts against the disk regulation member 55. Thus the disk regulation member 55 is driven counterclockwise as shown by the dot-dash-line in FIG. 10, and the side surface 55a thereof slightly projects upwardly of the accommodating recessed portion 72 as shown in FIG. 12. Consequently, the periphery of the disk D which has been released from the clamp by the clamper 15 and is lowered midway is pushed by the side surface 55a of the disk regulation member 55 in the right direction shown in FIG. 12. Thus the disk D is returned into the accommodating recessed portion 72, without staggering in the P direction.

On the other hand, as the driving unit chassis 12 is lowered, the arm member 61 is lowered on the right side thereof on the right side of the arrow Z, and thus the periphery of the disk D on the right side thereof is guided in a lowering direction by the regulating portion 61c of the arm member 61, whereby the disk D is securely returned into the accommodating recessed portion 72.

Then, as the taking-out arm 35 is turned counterclockwise, the tray Tx is returned to the magazine M. At this time, however, the upper surface of the disk D is regulated by the clamper 15 located at the position (B) as described above, and the opposite sides of the periphery of the disk D are regulated by the disk regulation member 55 and arm member 61. As a result, even when the tray Tx is being returned, the disk D is not removed from the accommodating recessed portion 72 of the tray Tx.

Note that in the above embodiment, although the disk is held between the turntable and the clamper so that the clamp chassis 11 is locked to the cabinet 10 and the driving unit chassis 12 is lifted, the arrangement may be such that the driving unit chassis 12 is stopped and the clamp chassis 11 is lowered. Alternatively, both chassis 11 and 12 may be moved in directions to approach each other.

Further, the mechanism for moving the clamper 15 to the three stages (A), (B) and (C) is not limited to the large diameter gear 31 but other types of cams or similar mechanisms may be used.

Further, the present invention is not limited to a disk changer to be mounted on a, car but may be a device in which a tray is drawn out from a disk placing unit other than the magazine, or a device in which a single tray is moved.

As described above, according to the present invention, a tray midway in its movement is effectively prevented from dislocating from the magazine. Further, the conventionally used small roller is not necessary, and so the disk is not scratched by the roller.

Also according to the present invention, not only is the disk prevented from flying out while the tray is being moved, but also a disk which is dislocated just after the clamping action between the turntable and the disk disposing unit is released can be securely returned to the disk placing unit.

I claim:

1. A disk device including a disk driving unit having a turntable and a clamper adjustably confronting the turntable, the disk device including a tray which is moved from a first location within a disk magazine to a second location in the disk driving unit, the tray having a disk placed thereon which is located between the turntable and the damper when the tray is in the second location, the disk device comprising:

a mechanism for cooperatively adjusting said tray and said clamper such that said clamper is positioned at a first distance from said turntable when said tray is in the first location, said mechanism positioning said clamper at a second distance from said turntable while moving said tray between the first location and the second location, and said mechanism moving said clamper to a third distance from said turntable after moving said tray to the second location, wherein the first distance is greater than the second and third distances, and the second distance is greater than the third distance.

2. The device of claim 1, wherein said damper is connected to a first chassis and said turntable is connected to a second chassis, wherein the first chassis is movably connected to the second chassis, the device further comprising an arm member having a first end connected to said first chassis and a second end connected to said second chassis, the arm member extending between said first chassis and said second chassis, said arm member being moved in response to movement of said first chassis relative to the second chassis from a first position wherein the arm member is nearer said disk, and a second position wherein the arm member is farther from said disk.

3. The device of claim 2, wherein said arm member is formed into an L-shape and includes a first end pivotally support on said second chassis.

4. The device of claim 1, further comprising a disk regulation member driven by said mechanism for preventing dislocation of said disk from said tray while said tray is moving from the first location to the second location.

5. The device of claim 4, wherein said disk regulation member is driven by said mechanism for cooperatively adjusting said tray and said clamper.

6. The device of claim 5, wherein said tray includes a disk accommodating recess for receiving said disk; and wherein when said tray is in the second location and said disk held between said turntable and said damper is released, said disk regulation member is moved toward a side of said disk accommodating recess of said tray such that said disk is guided by said disk regulation member to enter said disk accommodating recess.

7. The device of claim 1, wherein said clamper is movably mounted on a clamp chassis, and wherein said clamper moving mechanism comprises:

a gear positioned over the clamp chassis and having a control pin located thereon; and a resilient member positioned over the gear, the resilient member having a first portion connected to the clamper and a second portion connected to the clamp chassis, the resilient member having a planar surface including a projection and a recess which are located between the first and second portions;

wherein, when said gear is in a first rotated position, the pin is aligned with the projection to bias the resilient member away from the clamp chassis such that the clamper is maintained at the first distance from said turntable; and wherein, when said gear is in a third rotated position, the pin is received in the recess such that the clamper is maintained at the third distance from said turntable.

8. The device of claim 1, wherein said mechanism comprises:

a tray moving mechanism for moving said tray from the first location to the second location;

a clamper moving mechanism for moving said damper from the first distance from said turntable to the third distance from said turntable; and a drive mechanism for cooperatively driving said tray moving mechanism and said damper moving mechanism.

9. A disk device including a disk driving unit including a first chassis having a turntable and a clamp chassis having a clamper, said disk device including a tray which is moved from a first location within a disk magazine to a second location in the disk driving unit, the tray having a disk placed thereon which is located between the turntable and the clamper when the tray is in the second location, the disk device comprising:

an arm member having a first end pivotally supported on said first chassis and a second end pivotally supported on said clamp chassis, wherein while said tray is moving from the first location to the second location and said first chassis is spaced apart from said clamp chassis, said arm member is located at a first position relative to the disk such that a regulating portion of said arm member prevents unintentional dislocation of the disk from said tray, and when said first chassis and said clamp chassis are positioned such that said disk is held between said turntable and said clamper, said arm member is moved to a second position in which the regulating portion of the arm member is spaced apart from said disk by a greater distance than in said first position.

10. The device of claim 9, further comprising a disk regulation member driven by said clamp chassis for preventing dislocation of said disk from said tray while said tray is moving from the first location to the second location.

11. The device of claim 9, wherein said arm member is formed into an L-shape.

12. A disk device including a disk driving unit having a turntable, a clamper mounted on a clamp chassis and movably confronting the turntable, said disk device including a tray which is moved from a first tray position within a disk magazine to a second tray position in the disk driving unit, the tray defining a disk accommodating recess for receiving a disk, the disk being moved between a first disk location in the disk accommodating recess and a second disk location in which the disk is held between the turntable and the clamper when the tray is in the second tray position, the disk device comprising:

a tray moving mechanism for moving said tray from the first tray position to the second tray position; and a disk regulation member movably mounted on the clamp chassis, and being connected to the tray moving mechanism such that a movement of the disk regulation member is controlled by movement of the tray moving mechanism;

wherein while the tray is moving from the first tray position to the second tray position, the disk regulation member located above the disk is positioned in the disk accommodating recess such that the disk regulation member prevents dislocation of the disk from the disk accommodating recess.

13. The device of claim 12, further comprising a damper moving mechanism for moving said damper from a first distance from said turntable when said tray is in the first tray position to a second distance from said turntable when said tray is in the second tray position;

wherein the movement of the disk regulation member is associated with the damper moving mechanism and the tray moving mechanism.

14. The device of claim 13, wherein when the tray is in the second tray position and the disk held in the second disk location between said turntable and said damper is released, the disk regulation member is moved toward a side of the disk accommodating recess of the tray such that the disk is guided by the disk regulation member to enter the first disk location within the disk accommodating recess.

* * * * *

UNITED STATES PATENT AND TRADEMARK OFFICE
CERTIFICATE OF CORRECTION

PATENT NO. : 5,831,948
DATED : November 3, 1998
INVENTOR(S) : Shoji Suzuki

Page 1 of 2

It is certified that error appears in the above-identified patent and that said Letters Patent is hereby corrected as shown below:

On the title page,

In column 2, line 2, under "ABSTRACT", change "damper" to --clamper--.

In the Claims

In claim 1, line 6, change "damper" to --clamper--.

In claim 2, line 1, change "damper" to --clamper--.

In claim 3, line 3, change "support on said second chassis" to --supported on said first chassis and a second end pivotally supported on said second chassis--.

In claim 6, line 4, change "damper" to --clamper--.

In claim 7, line 16, after "turntable;" insert --wherein, when the gear is in a second rotated position, the pin abuts the planar surface of the resilient member such that the clamper is maintained at the second distance from said turntable;--.

UNITED STATES PATENT AND TRADEMARK OFFICE
CERTIFICATE OF CORRECTION

PATENT NO. : 5,831,948
DATED : November 3, 1998
INVENTOR(S) : Shoji Suzuki

It is certified that error appears in the above-identified patent and that said Letters Patent is hereby corrected as shown below:

In the Claims

In claim 8, line 9, change "damper" to --clamper--.

In claim 13, lines 1, 2, 7, change "damper" to --clamper--.

In claim 14, line 3, change "damper" to --clamper--.

Signed and Sealed this

Twenty-ninth Day of June, 1999

Attest:

Q. TODD DICKINSON

*Attesting Officer*     *Acting Commissioner of Patents and Trademarks*